United States Patent
Han et al.

(10) Patent No.: US 11,585,382 B2
(45) Date of Patent: Feb. 21, 2023

(54) PRE-TENSIONED ROLLING ELEMENT MOUNTING

(71) Applicant: Schaeffler Technologies AG & Co. KG, Herzogenaurach (DE)

(72) Inventors: Huimin Han, Taicang (CN); Klaus Zimmermann, Oberthulba (DE); Thomas Dittrich, Hammelburg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/282,202

(22) PCT Filed: Jun. 13, 2019

(86) PCT No.: PCT/DE2019/100541
§ 371 (c)(1),
(2) Date: Apr. 1, 2021

(87) PCT Pub. No.: WO2020/088708
PCT Pub. Date: May 7, 2020

(65) Prior Publication Data
US 2021/0372468 A1    Dec. 2, 2021

(30) Foreign Application Priority Data
Oct. 31, 2018  (CN) .......................... 201811288301.3

(51) Int. Cl.
*F16C 35/073*   (2006.01)
*F16C 19/38*    (2006.01)
(Continued)

(52) U.S. Cl.
CPC .......... *F16C 35/073* (2013.01); *F16C 19/385* (2013.01); *F16C 25/06* (2013.01);
(Continued)

(58) Field of Classification Search
CPC ...... F16C 25/06; F16C 35/061; F16C 35/062; F16C 35/073; F16C 35/078; F16C 43/04; F16C 2226/16; F16C 2229/00
See application file for complete search history.

(56) References Cited

U.S. PATENT DOCUMENTS 2,714,538 A  *  8/1955  Hornbostel ........... F16C 35/073
                                                    29/525
2,764,437 A  *  9/1956  Bratt ..................... F16C 35/073
                                                    29/898.07
(Continued)

FOREIGN PATENT DOCUMENTS

CN        108591282        9/2018
DE          863155    *    1/1953
(Continued)

*Primary Examiner* — James Pilkington
(74) *Attorney, Agent, or Firm* — Volpe Koenig

(57) ABSTRACT

A pre-tensioned bearing assembly, including: a first rolling bearing including a first outer ring, first inner ring including a first cylindrical surface, and a plurality of rolling elements radially disposed between the first inner and outer rings; a second rolling bearing including a second outer ring, a second inner ring including a second cylindrical surface, and a plurality of rolling elements radially disposed between the second inner and outer rings; a shaft including a shoulder in contact with the second rolling bearing; a first conically-shaped sleeve in contact with the first cylindrical surface and the second cylindrical surface, and including a conical inner surface; a second conically-shaped sleeve in contact with the conical inner surface; and a shaft nut including an internal thread in cooperation with the shaft, and fixing the first inner ring and the second inner ring axially onto the shaft.

18 Claims, 7 Drawing Sheets

(51) Int. Cl.
*F16C 35/06* (2006.01)
*F16C 35/078* (2006.01)
*F16C 25/06* (2006.01)
*F16C 33/60* (2006.01)

(52) U.S. Cl.
CPC .......... *F16C 33/605* (2013.01); *F16C 35/061* (2013.01); *F16C 35/062* (2013.01); *F16C 35/078* (2013.01); *F16C 2226/16* (2013.01); *F16C 2229/00* (2013.01)

(56) References Cited

U.S. PATENT DOCUMENTS

| | | |
|---|---|---|
| 3,816,013 A | 6/1974 | Schuhmann |
| 4,364,687 A | 12/1982 | Adell |
| 5,489,156 A | 6/1996 | Martinie |
| 5,685,650 A | 11/1997 | Martinie |
| 5,897,214 A | 4/1999 | Nisley |
| 7,866,894 B2 * | 1/2011 | Hewitt ................. F16C 35/078 29/898.07 |
| 9,556,901 B2 * | 1/2017 | Wheals ................. F16C 35/073 |
| 2008/0075402 A1 | 3/2008 | Hewitt |
| 2014/0314362 A1 | 5/2014 | Atkinson |

FOREIGN PATENT DOCUMENTS

| | | | |
|---|---|---|---|
| DE | 1816298 U | | 8/1960 |
| DE | 1108629 B | | 6/1961 |
| DE | 9216206 U1 | | 1/1993 |
| DE | 10161066 | * | 8/2002 |
| DE | 102005032529 | * | 1/2007 |
| DE | 102009005109 | * | 7/2010 |
| EP | 0424584 A1 | | 5/1991 |
| EP | 0926370 | | 6/1999 |
| EP | 2372145 A1 | | 10/2011 |
| JP | 2006-9967 | * | 1/2006 |

* cited by examiner

PRE-TENSIONED ROLLING ELEMENT MOUNTING

TECHNICAL FIELD

The present disclosure relates to a pre-tensioned rolling element bearing and a method for the assembly and a method for the disassembly of a pre-tensioned rolling element bearing.

BACKGROUND

A pre-tensioned rolling element bearing is understood to mean an arrangement in which a pre-tensioning acts on the rolling bearings used for support of, for example, a shaft, which restores an existing play between the rolling elements and the raceways provided by the bearing rings, thus ensuring a smooth and precise running of the rolling bearing To set this pre-tensioning, so-called shrink fitting has become established. For this purpose, the rolling bearing to be mounted is heated and, in this state, fitted onto the shaft with the bore thereof in the inner ring. If the rolling bearing then cools down, an interference fit is created between the inner ring of the rolling bearing and the shaft, which is responsible for the slight expansion of the inner ring, and any play in the unmounted state of the rolling bearing is reset or even completely eliminated. If the shaft is to be protected, it is not uncommon for an intermediate ring to be provided before the rolling bearing is shrunk onto the shaft, which is also shrunk onto the shaft before the rolling bearing is connected to the shaft. If an intermediate ring is used, the interference fit between the intermediate ring and the rolling bearing results in the pre-tensioning of the rolling bearing.

As is easy to see, the production of the desired pre-tensioning of the rolling bearing by shrink fitting is very complex. The same applies, of course, to the disassembly of pre-tensioned rolling bearings, because in contrast to assembly, the bore in the inner ring cannot be enlarged versus the shaft by heating, because heat sources acting on the rolling bearing always heat the shaft as well. For this reason, pre-tensioned rolling bearings can generally only be disassembled by using mechanically acting measures that destroy the rolling bearing.

SUMMARY

The present disclosure is based on a rolling bearing which includes an outer ring, an inner ring through which a bore runs, and rolling elements. The rolling elements roll on raceways provided by the two bearing rings. The bore of the inner ring is penetrated by a shaft when the rolling bearing is fitted onto the shaft. In addition, fixing means are provided which axially fix the inner ring fitted onto the shaft and thus the entire rolling bearing on the shaft. At least one of these fixing means is a shaft nut.

The simplified assembly and/or disassembly of the rolling bearing succeeds when the inner contour of the bore is formed conically, a first sleeve is provided which is releasably connected to the shaft, the outer casing of which is also formed conically and which has a radially outwardly directed collar end near the shaft nut, the conical inner contour of the bore rests against the conical outer casing of the first sleeve in the connected state of the inner ring and shaft, and the shaft nut is penetrated by at least one first axial bore The bore center of at least one of the axial bores and the bore center of an axial bore provided in the collar of the first sleeve and provided with a thread align with each other.

As will be shown in connection with the assembly and disassembly methods, the present disclosure assumes that an axial displacement of the first sleeve relative to the inner contour of the bore in the inner ring produces the interference fit between the inner ring and the shaft that produces or releases the required pre-tensioning.

If the first sleeve has recesses on the inner and/or outer casing surface, this has a high degree of instability and compressibility, which favors the production of the interference fit between the inner ring and the shaft.

Ending at the inner contour of the bore and/or on the shaft in the area between the fixing means, oil pressure bores which are connected to a hydraulic unit facilitate the assembly or disassembly when oil pressure is present at the oil pressure bores when the first sleeve is pushed in or pulled out.

An easy-to-produce cylindrical bore is retained in the inner ring when the inner contour of the bore is provided by a second sleeve which is inserted into the bore of the inner ring.

An easy assembly of the second sleeve of the bore of the inner ring is provided when the ring shape of the second sleeve is interrupted by at least one slot which completely traverses the second sleeve in the axial and radial directions.

A good and even distribution of the oil pressure is provided when the inner contour of the bore and/or the casing surfaces of the sleeves are provided with recesses and/or channels that are connected to the oil pressure bores. The fixing of the inner ring or the rolling bearing remains unchanged when securing means are provided that prevent the shaft nut from rotating.

A very precise setting of the pre-tensioning of the rolling bearing is given when measuring means are provided which detect the displacement path of the second sleeve with respect to the conical inner contour of the bore.

The simple and very precise assembly of a rolling bearing with regard to the pre-tensioning is achieved when the inner ring is fitted onto the shaft provided with the first sleeve so that the inner ring rests against one of the fixing means and the inner ring with the further fixing means in the form of a shaft nut is axially fixed to the shaft in that the shaft nut is brought into contact with the inner ring when feed screws are provided which are screwed into the respective axial bores provided for this purpose. As the screwing depth increases, the feed screws come into contact with the collar of the first sleeve and displace axially with respect to the inner contour of the bore. The axial displacement path of the first sleeve with respect to the inner contour of the bore is detected by a measuring device and the displacement of the first sleeve takes place under oil pressure, in that oil is pressed into the oil pressure bores by a hydraulic unit.

The pre-tensioned rolling bearing is easily disassembled from the shaft when the further fixing means in the form of a shaft nut is loosened to such an extent that the bore center of at least one axial bore of the shaft nut is aligned with a bore center of an axial bore provided in the collar of the first sleeve, then releasing screws are screwed through the axial bores in the shaft nut into axial bores provided on the collar. The first sleeve on the inner contour of the bore is pulled out axially upon contact of the screw head with the shaft nut and further screwing in of the releasing screws, and when disassembling the separation of the rolling bearing from the shaft takes place under oil pressure in that oil is pressed into the oil pressure bores by a hydraulic unit.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
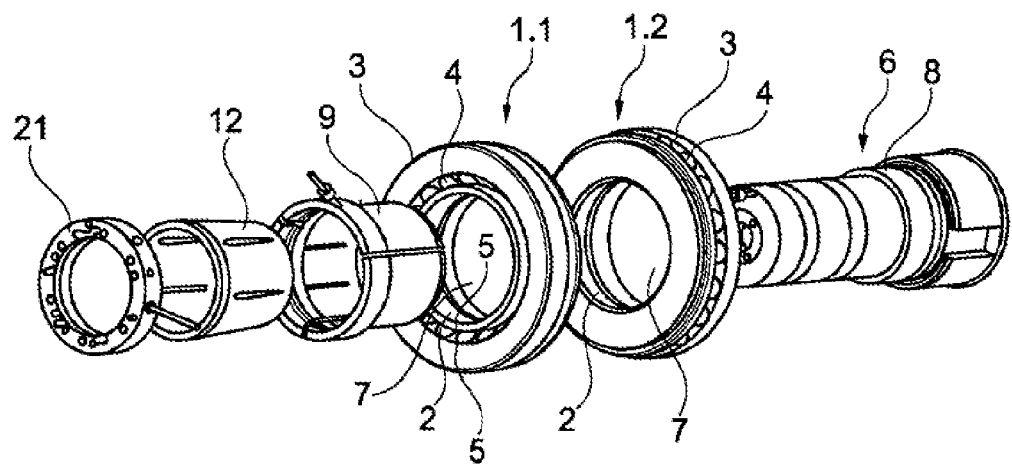
FIG. 1 shows a rolling element bearing.

In FIG. 1, a rolling element bearing is shown. In this exemplary embodiment, this rolling element bearing is formed by two rolling bearings 1.1 and 1.2 and, in another exemplary embodiment, also comprises only one of rolling bearings 1.1 or 1.2. Each of rolling bearings 1.1 and 1.2 is formed by inner ring 2, outer ring 3, coaxially surrounding inner ring 2, and rolling elements 4. Rolling elements 4 are radially disposed between ring 2 and ring 3, and roll on raceways 5 provided by inner ring 2 and outer ring 3 between respective bearing rings 2 and 3. Inner ring 2 of bearing 1.1 defines bore 7. Inner ring 2 of bearing 1.2 defines bore 7.

Furthermore, shaft 6 is shown in FIG. 1, which penetrates bore 7 of each of inner rings 2 when rolling bearings 1.1 and 1.2. are mounted on shaft 6. Shaft 6 is provided with a first fixing means, which is formed by shaft shoulder 8 provided in one piece with shaft 6. When rolling bearings 1.1 and 1.2 are mounted on shaft 6, rolling bearings 1.1 and 1.2 are axially unseparated from one another, with rolling bearing 1.2 being supported on shaft shoulder 8 through physical contact.

Figure 2:
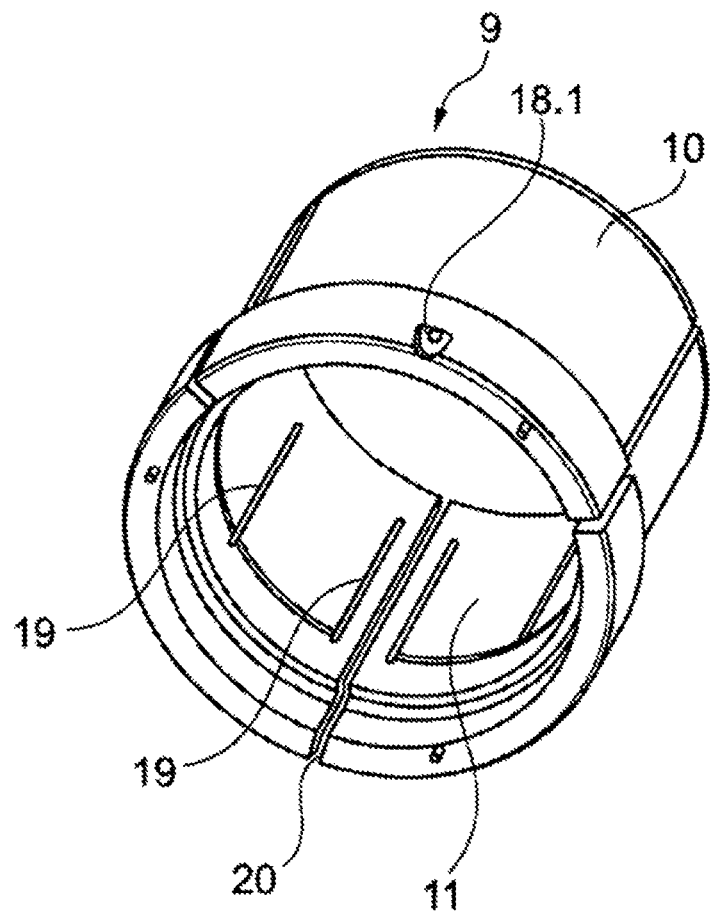
FIG. 2 shows a second sleeve.

Conically-shaped sleeve 9, in this exemplary embodiment, has cylindrical outer casing 10 and is inserted into cylindrical bores 7 of inner rings 2 when rolling bearings 1.1 and 1.2 are mounted on shaft 6. Inner surface 11 of sleeve 9 is formed conically. As can be seen in FIG. 2, which shows sleeve 9 on an enlarged scale, sleeve 9 is provided with oil pressure bore 18.1 which can be connected to a hydraulic unit, not shown. Oil pressure bore 18.1 feeds radially inwardly open channels 19 provided on inner surface 11 of sleeve 9. To facilitate insertion of sleeve 9 into bore 7 of inner rings 2, sleeve 9 defines slot 20, which completely passes through sleeve 9 axially and radially and therefore reduces the diameter of sleeve 9 elastically somewhat during insertion of sleeve 9 into bore 7.

Figure 3:
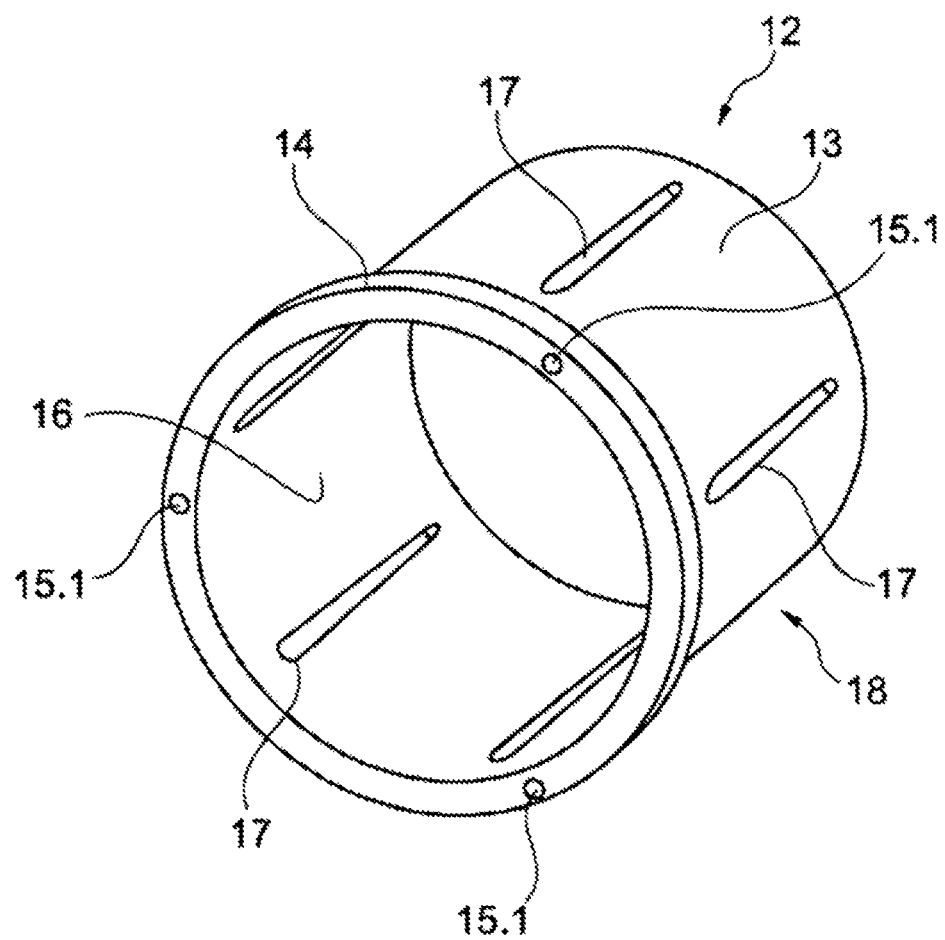
FIG. 3 shows a first sleeve.

Conically-shaped sleeve 12 has conical outer casing 13 and radially outwardly directed collar 14 (FIG. 3). Three threaded axial bores 15.1 are defined by collar 14. In addition, conical outer casing 13 and cylindrical inner casing 16 of sleeve 12 define trough-shaped recesses 17 to increase lability and compressibility of sleeve 12, and which extend in the direction of the longitudinal axis of sleeve 12, but without breaking through sleeve body 18 of sleeve 12.

Figure 4:
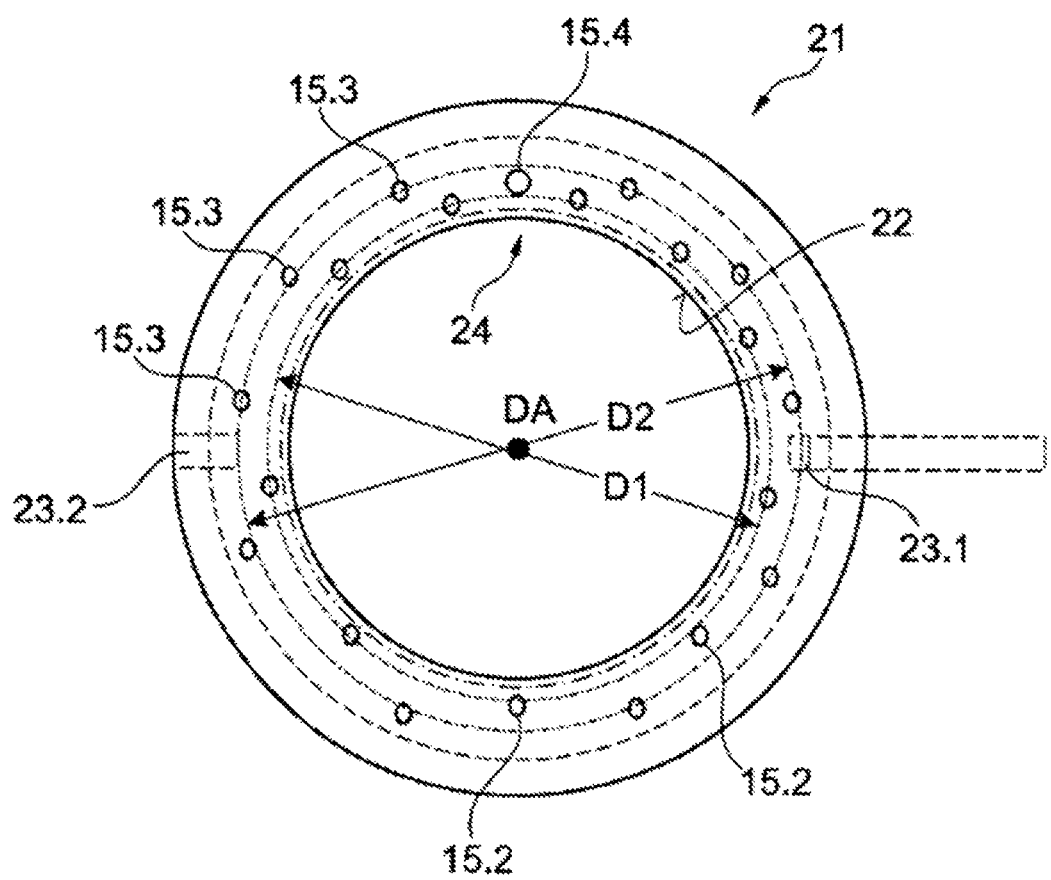
FIG. 4 shows a shaft nut.

FIG. 1 also shows a further fixing means, which in the present case is formed by shaft nut 21. When rolling bearings 1.1 and 1.2 are fitted onto shaft 6 so that rolling bearing 1.2 rests against shaft shoulder 8, and sleeves 9 and 12 are arranged between inner rings 2 and shaft 6, inner rings 2 fix rolling bearings 1.1 and 1.2 axially on shaft 6 by tightening shaft nut 21. For this purpose, as shown in FIG. 4, shaft nut 21 is provided with internal thread 22, which cooperates in a known manner with an external thread (not shown) on shaft 6. In addition, axial bores 15.2, 15.3 and 15.4 and radial bores 23.1 and 23.2 are defined by shaft nut 21 (FIG. 4). Rods can be inserted into radial bores 23.1 and 23.2 (as indicated for radial bore 23.1) to rotate shaft nut 21 relative to shaft 6. Axial bores 15.2 lie on partial diameter D1, which is smaller than pitch circle diameter D2 on which axial bores 15.3 lie. Furthermore, annular groove 24 is introduced from the inside of shaft nut 21, which extends in the circumferential direction and reaches almost to the outer circumference of shaft nut 21 (indicated by the dashed lines). Annular groove 24 is penetrated by axial bore 15.4. When shaft nut 21 is screwed onto shaft 6 and when a screw (not shown) is screwed into axial bore 15.4, the axial width of annular groove 24 changes somewhat, as a result of which the threads of internal thread 22 of shaft nut 21 are pressed against the threads of shaft 6 in a known manner to achieve screw locking.

Figure 5:
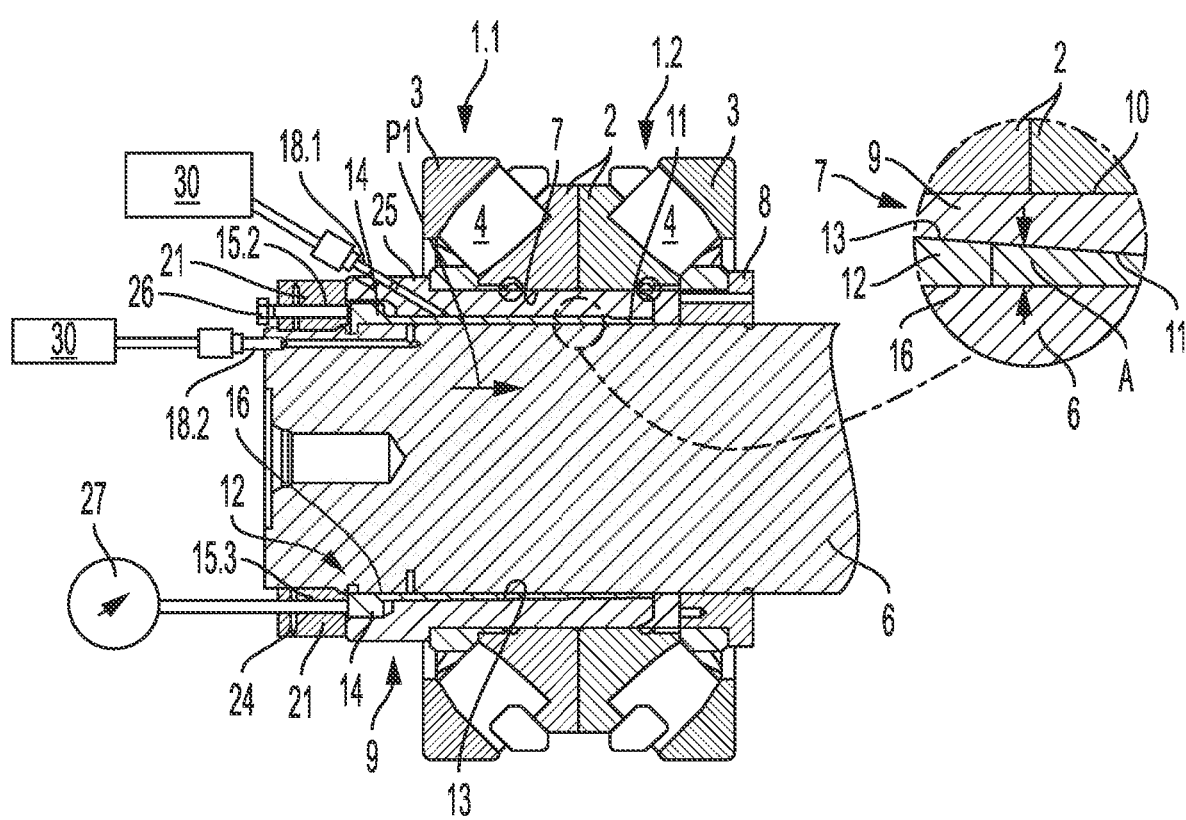
FIG. 5 shows an assembly illustration.

The assembly of a pre-tensioned rolling element bearing will now be explained with reference to FIG. 5. For this purpose, two rolling bearings 1.1 and 1.2 are already fitted back-to-back onto shaft 6 so that inner ring 2 of rolling bearing 1.2 rests on shaft shoulder 8 of shaft 6. Bore 7 of inner rings 2 is borne down on by sleeve 9, inner surface 11 of which maintains small radial spacing A from shaft 6. Since inner surface 11 of sleeve 9 is formed conically, radial spacing A increases starting from the end near shaft shoulder 8 to the end remote from shaft shoulder 8. Furthermore, sleeve 9 is provided at the end remote from shaft shoulder 8 with radially outwardly directed flange 25 which, in the assembled state, rests on inner ring 2 of rolling bearing 1.1. Sleeve 12 is inserted into radial spacing A, cylindrical inner casing 16 thereof surrounding shaft 6 and conical outer casing 13 thereof extending complementarily to inner surface 11 of sleeve 9 and thus engages somewhat in radial spacing A.

Rolling bearings 1.1 and 1.2 are also ultimately axially fixed by screwing shaft nut 21 onto shaft 6, in that inner rings 2 are pressed against shaft shoulder 8 by shaft nut 21 through intermediary of flange 25.

Feed screws 26 are then screwed into threaded axial bores 15.2 of shaft nut 21, which then meet collar 14 of sleeve 12 and displace sleeve 12 in the direction of arrow P1 relative to sleeve 9, thereby forming the interference fit required for the pre-tensioning of rolling bearings 1.1 and 1.2. That is, displacing sleeve 12 in the direction of arrow P1 relative to sleeve 9 expands sleeve 9 and cylindrical outer casing 10 radially outwardly so that casing 10 urges races 2 radially outwardly.

The tightening of feed screws 26 or movement of sleeve 12 relative to sleeve 9 takes place under oil pressure. For this purpose, oil pressure bore 18.1 on sleeve 9 is connected to hydraulic unit 30, oil is pressed into channels 19 (FIG. 2) of sleeve 9, and radial spacing A between shaft 6 and sleeve 9 is increased somewhat so as to facilitate the insertion of sleeve 12 into sleeve 9. As can be taken from FIG. 5, shaft 6 is also provided with oil pressure bore 18.2 which, like oil pressure bore 18.1, is connected to hydraulic unit 30 during assembly and thus likewise presses oil in the area between shaft nut 21 and shaft shoulder 8.

The axial movement of sleeve 12 with respect to sleeve 9 is recorded by dial gauge 27 which is fixed in axial bore 15.3 and is in operative connection with collar 14 of first sleeve 12.

Figure 6:
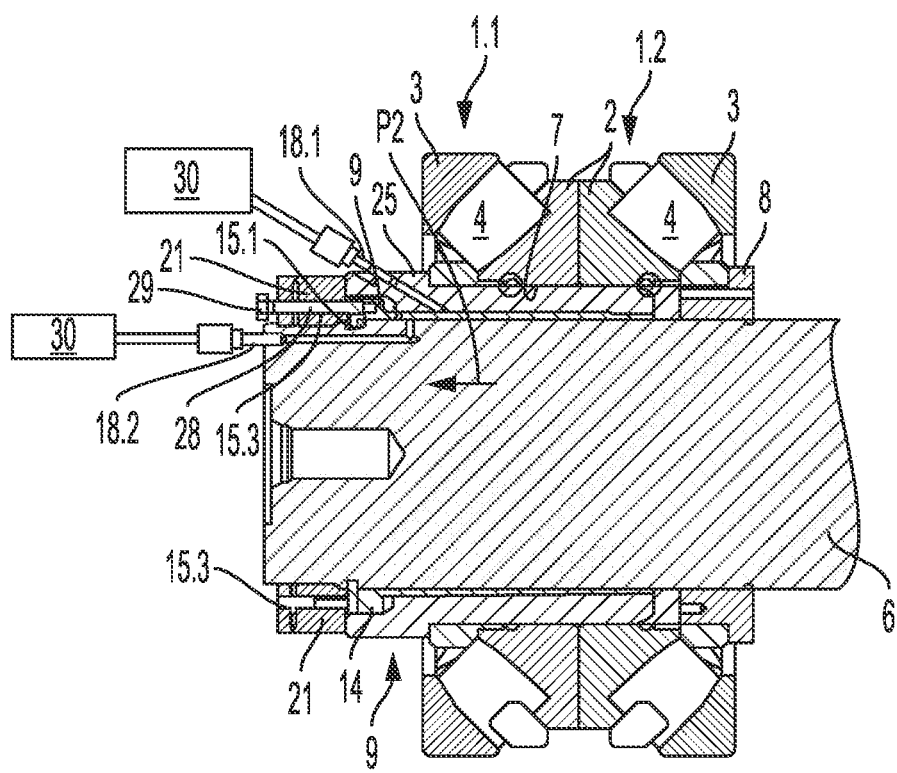
FIG. 6 shows a disassembly illustration.

The disassembly of a pre-tensioned rolling element bearing will now be explained with reference to FIG. 6. For this purpose, the screw 26 locking the shaft nut 21 is first removed and the shaft nut 21 is loosened so far that the bore centers of axial bores 15.3 are aligned with the bore centers of axial bores 15.1 in collar 14 of sleeve 12. When feed screws 26 are left in axial bores 15.2 of shaft nut 21 after assembly, which can be advantageous for axially supporting sleeve 12, feed screws 26 must of course be loosened or removed before shaft nut 21 is loosened. Releasing screws 28 are then inserted into axial bores 15.3, which are designed only as through-bores, and screwed into threaded axial bores 15.1 of sleeve 12. When screw heads 29 of releasing screws 28 come into contact with shaft nut 21, releasing screws 28 pull sleeve 12 somewhat out of radial spacing A between sleeve 9 and shaft 6 in the direction of arrow P2, whereby the interference fit is canceled, rolling bearings 1.1, 1.2 lie loosely on shaft 6 and, after shaft nut 21 has been completely removed, can be pulled off shaft 6 easily and without any additional force. As already explained in connection with FIG. 5, disassembly is also advantageously carried out under oil pressure, in that respective oil pressure bores 18.1, 18.2 are connected to hydraulic unit 30.

Special releasing screws 28 need not be provided, but feed screws 26 can also be used for disassembly if thread-free axial bores 15.3 have a slightly larger diameter than threaded axial bores 15.2, so that screws used as feed screws 26 and now serving as releasing screws 28 can be freely inserted through thread-free axial bores 15.3.

So as not to weaken the strength of shaft nut 21 through many axial bores 15.2, 15.3 arranged on two pitch circles, a pitch circle with axial bores can be dispensed with in another embodiment—not shown further. In this case, threaded axial bores 15.2 arranged only on partial diameter D1 are used not only as threaded bores for feed screws 26, but at the same time also as mere through-bores for receiving releasing screws 28. To achieve this, however, it goes without saying that separate releasing screws 28 must be used, the diameter of which is smaller than that of feed screws 26, so that release screws 28 here can also be freely inserted through axial bores 15.2.

Figure 7:
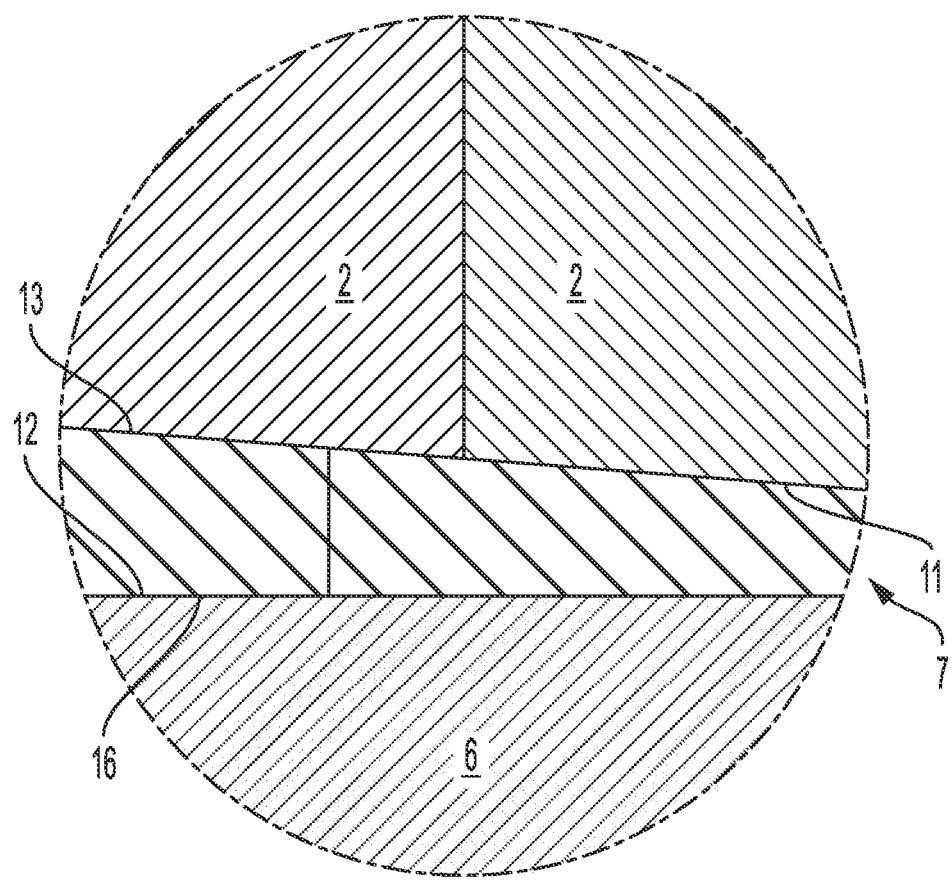
FIG. 7 shows a detail of inner ring and shaft

So far it has been assumed that surface 11, which interacts with conical outer casing 13 of sleeve 12, is provided by sleeve 9. As FIG. 7 shows, which shows only a section similar to the detailed drawing according to FIG. 5, surface 11 can also be provided directly on inner rings 2, which then slightly increases the machining effort due to the conicity of bores 7 in inner rings 2. Surface 11 formed directly on inner rings 2 then interacts with likewise conical outer casing 13 of sleeve 12 to produce an interference fit.

LIST OF REFERENCE SYMBOLS 1.1, 1.2 Rolling bearing
2 Inner ring
3 Outer ring
4 Rolling element
5 Raceway
6 Shaft
7 Bore
8 Shaft shoulder
9 Second sleeve
10 Cylindrical outer casing
11 Inner surface
12 First sleeve
13 Conical outer casing
14 Collar
15.1, 15.2, 15.n Axial bore
16 Cylindrical inner casing
17 Recesses
18.1; 18.2 Oil pressure bore
19 Channel
20 Slot
21 Shaft nut
22 Internal thread
23 Radial bores
24 Annular groove
25 Flange
26 Feed screws
27 Dial indicator
28 Releasing screws
29 Screw head
30 Hydraulic unit

The invention claimed is:

1. A pre-tensioned bearing assembly, comprising:
a first rolling bearing including:
a first outer ring;
a first inner ring including a first cylindrical surface defining a first bore; and,
a first plurality of rolling elements radially disposed between the first inner ring and the first outer ring;
a shaft inserted through the first rolling bearing and including a shoulder in contact with the first rolling bearing;
a first conically-shaped sleeve:
penetrating the first bore; and,
in contact with the first cylindrical surface, wherein the first conically-shaped sleeve includes a cylindrical outer casing in contact with the first cylindrical surface and a conically formed inner surface;
a second conically-shaped sleeve:
including a conical outer casing in contact with the conically formed inner surface; and,
defining a second bore through which the shaft extends; and,
a shaft nut:
including an internal thread in cooperation with the shaft; and,
fixing the first inner ring onto the shaft.

2. The pre-tensioned bearing assembly of claim 1, wherein:
the second conically-shaped sleeve includes a collar extending radially outwardly; and,
the second bore passes axially through the collar.

3. The pre-tensioned bearing assembly of claim 1, wherein:
the second conically-shaped sleeve includes:
a collar extending radially outwardly from the conical outer casing; and,
the second bore passes axially through the collar.

4. The pre-tensioned bearing assembly of claim 1, wherein the shaft nut includes a third bore aligned with the second bore parallel to an axis of rotation of the pre-tensioned bearing assembly.

5. The pre-tensioned bearing assembly of claim 1, wherein:
the second conically-shaped sleeve includes:
a cylindrical inner casing; and,
the second conically-shaped sleeve defines at least one recess in the conical outer casing or in the cylindrical inner casing.

6. The pre-tensioned bearing assembly of claim 1, wherein:
the conically formed inner surface defines at least one channel; and,
the first conically-shaped sleeve:
defines at least one bore connecting the cylindrical outer casing to the at least one channel.

7. The pre-tensioned bearing assembly of claim 1, wherein the first conically-shaped sleeve defines a slot running completely through the first conically-shaped sleeve in an axial direction and in a radial direction.

8. The pre-tensioned bearing assembly of claim 1, further comprising:
a second rolling bearing including:
a second outer ring;
a second inner ring including a second cylindrical surface defining a bore; and,
a second plurality of rolling elements radially disposed between the second inner ring and the second outer ring; and,
the shaft nut fixes the second inner ring axially onto the shaft.

9. A pre-tensioned bearing assembly, comprising:
a first rolling bearing including:
a first outer ring;
a first inner ring including a first cylindrical surface defining a first bore; and,
a first plurality of rolling elements radially disposed between the first inner ring and the first outer ring;
a second rolling bearing including:
a second outer ring;
a second inner ring including a second cylindrical surface defining a second bore; and,
a second plurality of rolling elements radially disposed between the second inner ring and the second outer ring;
a shaft including a shoulder in contact with the second rolling bearing;
a first conically-shaped sleeve:
in contact with the first cylindrical surface and the second cylindrical surface; and,
including a conically formed inner surface;
a second conically-shaped sleeve in contact with the conically formed inner surface; and,
a shaft nut:
including an internal thread in cooperation with the shaft; and,
fixing the first inner ring and the second inner ring axially onto the shaft.

10. The pre-tensioned bearing assembly of claim 9, wherein the second conically-shaped sleeve includes:
a conical outer casing;
a collar extending radially outwardly from the conical outer casing; and,
a third bore passing axially through the collar.

11. The pre-tensioned bearing assembly of claim 10, wherein the shaft nut includes a fourth bore aligned with the third bore parallel to an axis of rotation of the pre-tensioned bearing assembly.

12. The pre-tensioned bearing assembly of claim 9, wherein:
the second conically-shaped sleeve includes:
a conical outer casing; and,
a collar extending radially outwardly from the conical outer casing; and, the shaft nut is in contact with the collar.

13. The pre-tensioned bearing assembly of claim 9, wherein:
the second conically-shaped sleeve includes:
a conical outer casing; and,
a cylindrical inner casing; and,
the second conically-shaped sleeve defines at least one recess in the conical outer casing or in the cylindrical inner casing.

14. The pre-tensioned bearing assembly of claim 9, wherein the first conically-shaped sleeve includes a cylindrical outer casing in contact with the first cylindrical surface and with the second cylindrical surface.

15. The pre-tensioned bearing assembly of claim 9, wherein the first conically-shaped sleeve:
includes a conically formed inner surface;
defines at least one channel in the conically formed inner surface;
includes a cylindrical outer casing; and,
defines at least one third bore connecting the cylindrical outer casing to the at least one channel.

16. A method of assembling a pre-tensioned bearing assembly including a first rolling bearing with a first inner ring including a first cylindrical surface defining a first bore, a second rolling bearing including a second inner ring including a second cylindrical surface defining a second bore, a shaft including a shoulder, a first conically-shaped sleeve, a second conically-shaped sleeve, and a shaft nut, the method comprising:
fitting the first rolling bearing and the second rolling bearing on the shaft such that the second rolling bearing contacts the shoulder;
inserting the first conically-shaped sleeve around the shaft and through the first bore and through the second bore;
contacting the first cylindrical surface and the second cylindrical surface with a cylindrical outer casing of the first conically-shaped sleeve;
inserting the second conically-shaped sleeve into a space defined by the shaft and a conically formed inner surface of the first conically-shaped sleeve, the space radially increasing in a first axial direction parallel to an axis of rotation of the pre-tensioned bearing assembly;
displacing, in a second axial direction, opposite the first axial direction, the shaft nut along the shaft;
displacing, with the shaft nut, the first conically-shaped sleeve in the second axial direction;
contacting the first inner ring with a flange of the first conically-shaped sleeve;
urging, with the first conically-shaped sleeve, the second rolling bearing against the shoulder of the shaft;
screwing a feed screw through a threaded axial bore in the shaft nut and into contact with a collar of the second conically-shaped sleeve; and,
displacing, with the feed screw, the second conically-shaped sleeve, with respect to the first conically-shaped sleeve, in the second axial direction.

17. The method of claim 16, wherein displacing, with the feed screw, the second conically-shaped sleeve, with respect to the first conically-shaped sleeve, in the second axial direction includes:
expanding the cylindrical outer casing of the first conically-shaped sleeve radially outwardly; and,
urging, with the cylindrical outer casing of the first conically-shaped sleeve, the first inner ring and the second inner ring radially outwardly.

18. The method of claim 16, wherein displacing, with the feed screw, the first conically-shaped sleeve, with respect to the second conically-shaped sleeve, in the second axial direction includes:
pressing oil through a bore defined by the first conically-shaped sleeve and into the space defined by the shaft and the conically formed inner surface; and,
urging, with the oil, the first conically-shaped sleeve radially outwardly.

* * * * *